United States Patent [19]

Kitajima et al.

[11] Patent Number: 5,494,575
[45] Date of Patent: Feb. 27, 1996

[54] FILTER DEVICE

[75] Inventors: Kyoji Kitajima; Shunichi Nogami, both of Saitama, Japan

[73] Assignee: Honda Giken Kogyo Kabushiki Kaisha, Tokyo, Japan

[21] Appl. No.: 390,520

[22] Filed: Feb. 17, 1995

[30] Foreign Application Priority Data

Mar. 24, 1994 [JP] Japan .................................. 6-079476

[51] Int. Cl.⁶ .......................... B01D 35/027; B01D 29/23
[52] U.S. Cl. ...................... 210/168; 210/416.5; 210/445; 184/6.24
[58] Field of Search ............................... 210/168, 416.5, 210/445, 488; 74/467, 606 R, 606 A; 184/6.12, 6.24; 123/196 A

[56] References Cited

U.S. PATENT DOCUMENTS

| | | |
|---|---|---|
| 3,056,501 | 10/1962 | Thorman . |
| 4,136,011 | 1/1979 | Joseph . |
| 4,402,827 | 9/1983 | Joseph . |
| 4,600,511 | 7/1986 | Sherman . |
| 4,826,598 | 5/1989 | Cain . |

FOREIGN PATENT DOCUMENTS 3-17362  2/1991  Japan .

Primary Examiner—Thomas M. Lithgow
Attorney, Agent, or Firm—Nikaido, Marmelstein, Murray & Oram

[57] ABSTRACT

In a filter device suitable for use in an automotive automatic transmission system employing a fluid torque converter, two layers of filter sheets are interposed between upper and lower casing halves provided with an outlet and an inlet, respectively. The inlet is communicated with a filter chamber defined between the upper and lower filter sheets, and a communication passage is defined between an upper chamber and a lower chamber defined above and below the filter sheets inside the casing, respectively. A pair of flow paths are defined between the inlet and the outlet. The first of the flow paths passes the upper filter sheet and heads directly for the outlet. The second of the flow paths passes through the lower filter sheet, and passes through the communication passage before heading for the outlet. An obstruction is provided in the first flow path to the end of evenly or optimally distributing the flow of the working fluid between the two filter sheets. Creation of high flow speed regions near the inlet and the outlet can be avoided even when the inlet and outlet are placed close to each other. Thus, the entire surface area of the filter element can be effectively utilized so that the filtering efficiency can be improved, and the pressure drop across the filter device can be reduced.

16 Claims, 7 Drawing Sheets

Fig. 6 (A)
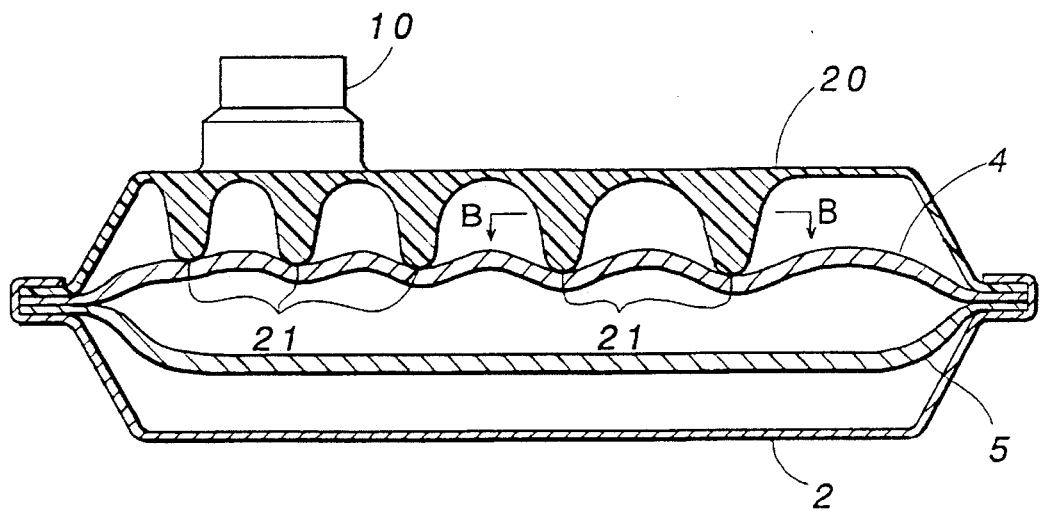
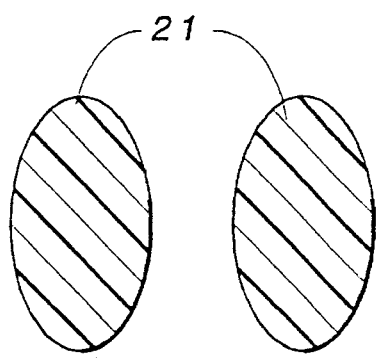
Fig. 6(B)
Fig. 8
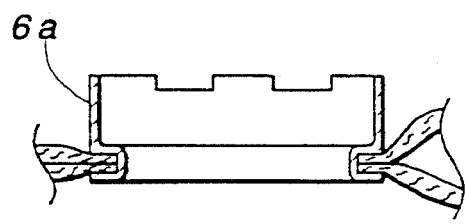

FILTER DEVICE

TECHNICAL FIELD

The present invention relates to a filter device which is particularly useful for filtering working fluid in hydraulically operated systems, fluid torque converters, fluid couplings, retarders and other systems involving the use of working fluid, and in particular to a filter device including a casing having an inlet and an outlet in mutually close positions. The application of the present invention however is not restricted to the above mentioned applications, but can be found in any applications where a compact and efficient filter device is needed.

BACKGROUND OF THE INVENTION

Japanese utility model laid open publication No. 3-17362 discloses a typical conventional filter device for use in automotive automatic transmission systems. Such a filter device is typically provided in a conduit leading to an inlet of an oil pump, and is required to be placed in a lower part of the oil sump of the automatic transmission system to ensure the working fluid to be always supplied to the inlet end of the oil pump even when the vehicle is making a turn at high speed or travelling on steep slopes. Therefore, the filter device is required to be constructed as a highly compact unit, and it is often necessary to provide an inlet and an outlet of the filter device close to each other. As a result, the flow of the working fluid may not be favorably guided inside the filter device so that high flow speed regions and stagnant regions may be created inside the casing of the filter device. This in turn causes the flow of the working fluid to be distributed unevenly over the effective surface area of the filtering material so that the entire filtering material may not be effectively utilized, and the pressure drop across the filter device may be undesirably increased.

BRIEF SUMMARY OF THE INVENTION

In view of such problems of the prior art, a primary object of the present invention is to provide a filter device which can allow the entire surface area of the filtering material to be fully utilized, and can thereby improve its filtering efficiency.

A second object of the present invention is to provide a filter device which produces a relatively small pressure drop.

A third object of the present invention is to provide a filter device which is highly compact, and can be installed in a limited space.

A fourth object of the present invention is to provide a filter device which is simple in structure, economical to fabricate, and efficient in operation.

These and other objects of the present invention can be accomplished by providing a filter device, comprising: a casing including a first casing half provided with an outlet, and a second casing half provided with an inlet; a filter element including a first filter sheet and a second filter sheet which are interposed in mutually overlaid condition between the first and second casing halves thereby defining a filter chamber between the filter sheets, a communication passage defined by joining peripheral edges of mutually juxtaposed communication openings of the filter sheets, and an inlet passage communicating the inlet with the filter chamber through an inlet opening provided in the second filter sheet opposing the second casing half; whereby first and second flow paths are defined between the inlet and the outlet, the first flow path passing through the first filter sheet, and second flow path passing through the second filter sheet and the communication passage; flow restricting means being provided in the first flow path to optimally or evenly distribute flow rates between the first and second flow paths.

Thus, the flow restricting means can prevent creation of high flow speed regions near the inlet and the outlet or, in other words, creation of a short circuiting in the flow path of the working fluid can be avoided even when the inlet and outlet are placed close to each other. Thus, the entire surface area of the filter element can be effectively utilized so that the filtering efficiency can be improved, and the pressure drop across the filter device can be reduced.

The flow restricting means may consist of a plurality of projections arranged in the first casing half around the outlet. In particular, when the first casing half is made of sheet metal, the projections may be formed on top of a ridge provided in the first casing half around the outlet so that a highly deep drawing work may not be required for forming the projections of desired heights.

As a measure for evenly distributing the flow rate over the entire first filter sheet, the inlet and the outlet provided in the casing may be mutually offset from each other, and a distance between the outlet and each of the projections may be progressively increased as a distance between the inlet and the corresponding projection increases. Alternatively or additionally, to achieve such a goal, a height of each of the projections may be progressively increased as a distance between the inlet and the corresponding projection increases, and/or a distance between adjacent ones of the projections may be progressively increased as a distance between the inlet and the corresponding projections increases.

If the first casing half is made of plastic material, the projections having desired heights can be integrally molded with the first casing half without any difficulty. In view of favorably guiding the flow of the working fluid, the projections may be elongated in a radial directions with respect to the outlet. Also, the bottom surface of the first and second casing halves may be provided with beads to favorably guide the flow of the working fluid which has passed through the corresponding filter sheets.

Alternatively, the flow restricting means may comprise a tubular extension of a tubular member crimped on peripheral edges of the communication openings of the filter sheets and defining the communication passage, the tubular extension being provided with a substantially annular free end which could abut a part of the first casing half surrounding the outlet. The free end of the tubular extension may be substantially parallel with a surface of the part surrounding the outlet, may be inclined with respect a surface of the part surrounding the outlet, or may have an irregular contour with respect a surface of the part surrounding the outlet to achieve a desired degree of flow restriction.

According to a preferred embodiment of the present invention, the inlet passage is defined by an inwardly directed tubular extension of the second casing half having a free end which is crimped upon the inlet opening of the second filter sheet. Thus, the entire assembly can be fabricated with a minimum number of component parts, and in an economical fashion.

The favorable distribution of the flows of the working fluids through the first and second filter sheets can also be accomplished by other means for restricting the flow through the first filter sheet. For instance, the first filter sheet may present a greater flow resistance for each given area thereof than the second filter sheet. This can be accomplished for instance by using two different materials having different porosities for the first and second filter sheets, and thereby giving the first filter sheet with a greater flow resistance than the second filter sheet. Alternatively, the same goal can be accomplished by placing a flow resisting sheet member at least partly over the first filter sheet.

BRIEF DESCRIPTION OF THE DRAWINGS

Now the present invention is described in the following with reference to the appended drawings, in which:

FIG. 6(A) is a sectional view taken along line A—A of FIG. 5;

FIG. 6(B) is a sectional view taken along line B—B of FIG. 6(A);

FIG. 8 is a fragmentary sectional view of a part of a modified embodiment similar to the third embodiment.

DETAILED DESCRIPTION OF THE PREFERRED EMBODIMENTS

Figure 1:
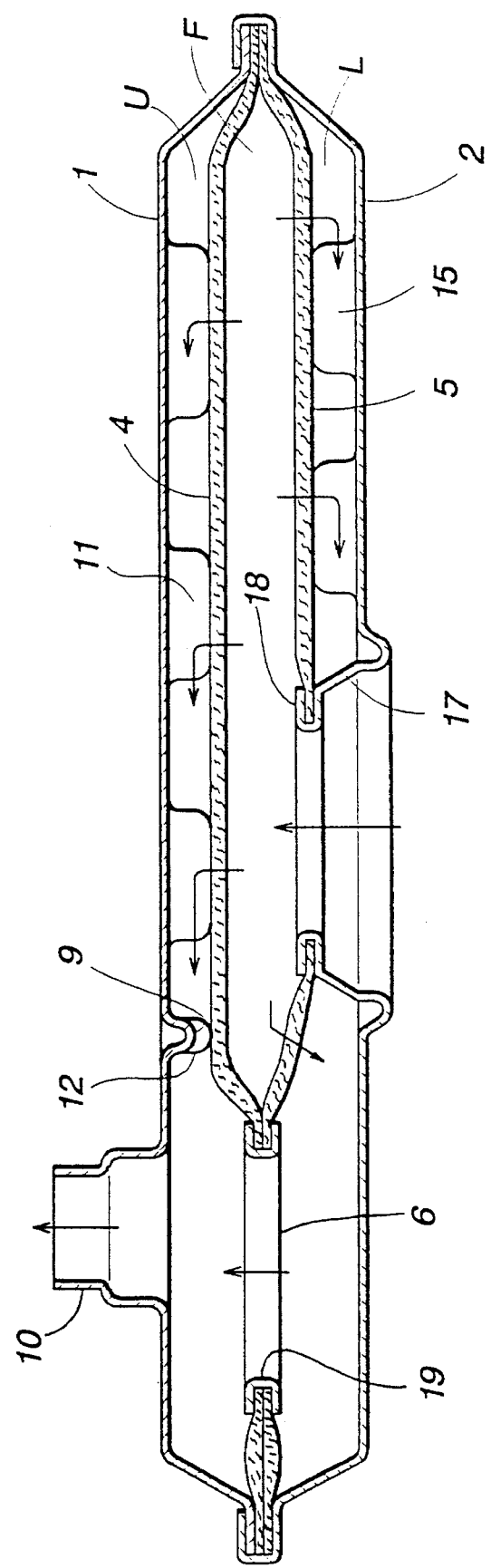
FIG. 1 is a sectional view of a first embodiment of the filter device according to the present invention.
Figure 2:
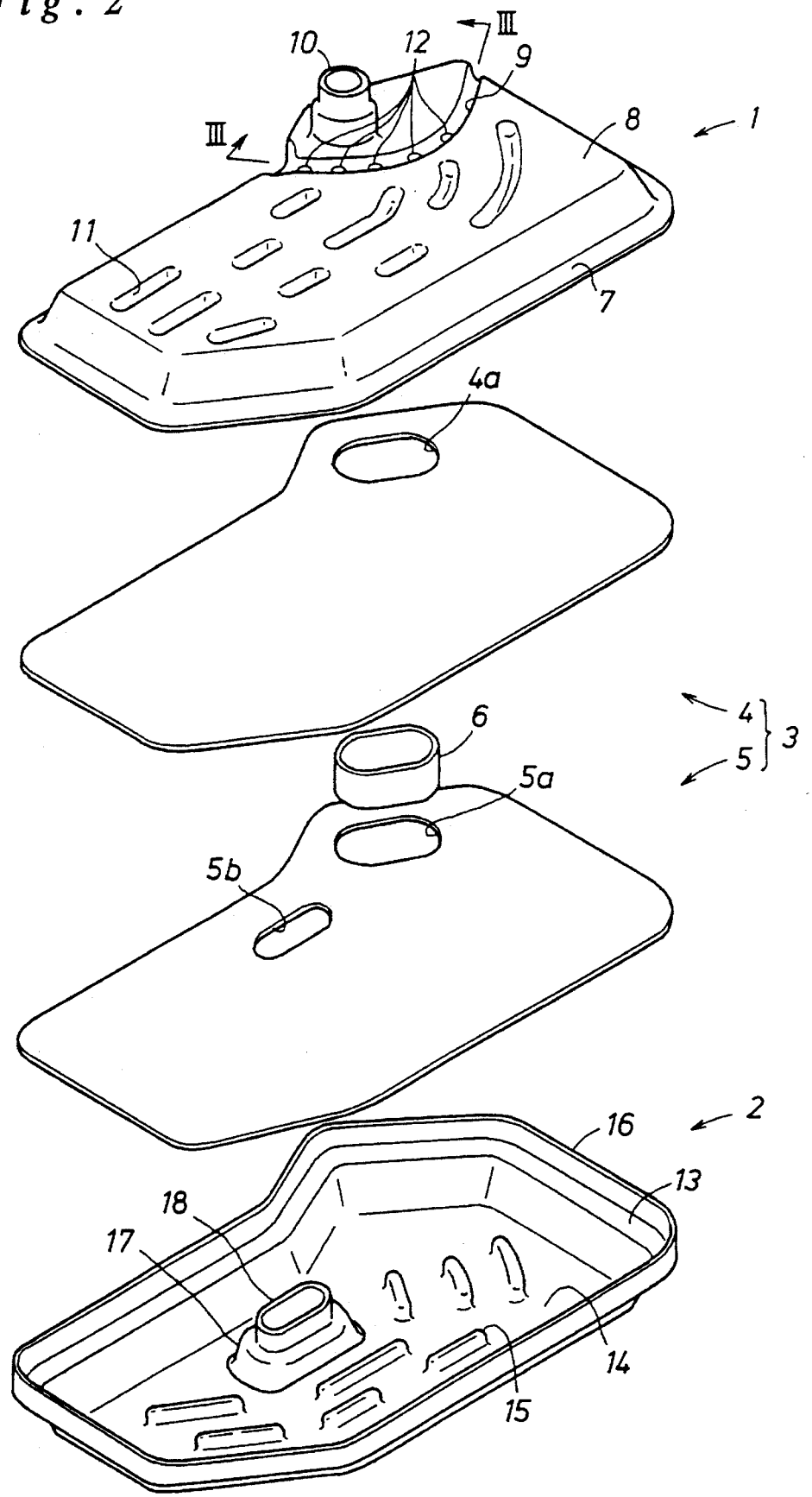
FIG. 2 is an exploded perspective view of the first embodiment.

FIGS. 1 and 2 show a first embodiment of the filter device according to the preset invention. This filter device is adapted to remove metallic powder and other foreign matters from the working fluid (ATF) of an automotive automatic transmission system, and comprises upper (first) and lower (second) casing halves 1 and 2, and a filter element 3 consisting of upper (first) and lower (second) filter sheets 4 and 5, and interposed between the two casing halves 1 and 2. The upper and lower casing halves 1 and 2 are press formed or stamped into the shape of shallow pans, and are thus provided with bottom plates 8 and 14 which are recessed from their peripheral edges 7 and 13.

The filter sheets 4 and 5 are provided with communication openings 4a and 5a, respectively, in mutually aligned or juxtaposed positions, and a tubular member 6 is crimped along the edges of these openings 4a and 5a so as to join the upper and lower filter sheets 4 and 5 with each other. Also, this tubular member 6 defines a communication passage 19 which communicates a lower chamber L defined between the lower filter sheet 5 and the bottom plate 14 of the lower casing half 2 with an upper chamber U defined between the upper filter sheet 4 and the bottom plate 8 of the upper casing half 1. The upper and lower filter sheets 4 and 5 define a substantially enclosed filter chamber F between them.

The upper and lower filter sheets 4 and 5 are made of unwoven fabric, and are substantially conformal to the peripheral edge of the upper casing half 1.

In this embodiment, the casing halves 1 and 2 as well as the tubular member 6 are made of sheet metal such as steel plate, and the outer edges of the filter sheets 4 and 5 are joined together by crimping an upright flange 16 of the peripheral edge 13 of the lower casing half 2 onto the peripheral edge 7 of the upper casing half 1, and clamping the peripheral edges of the upper and lower filter sheets 4 and 5 between them.

Figure 4:
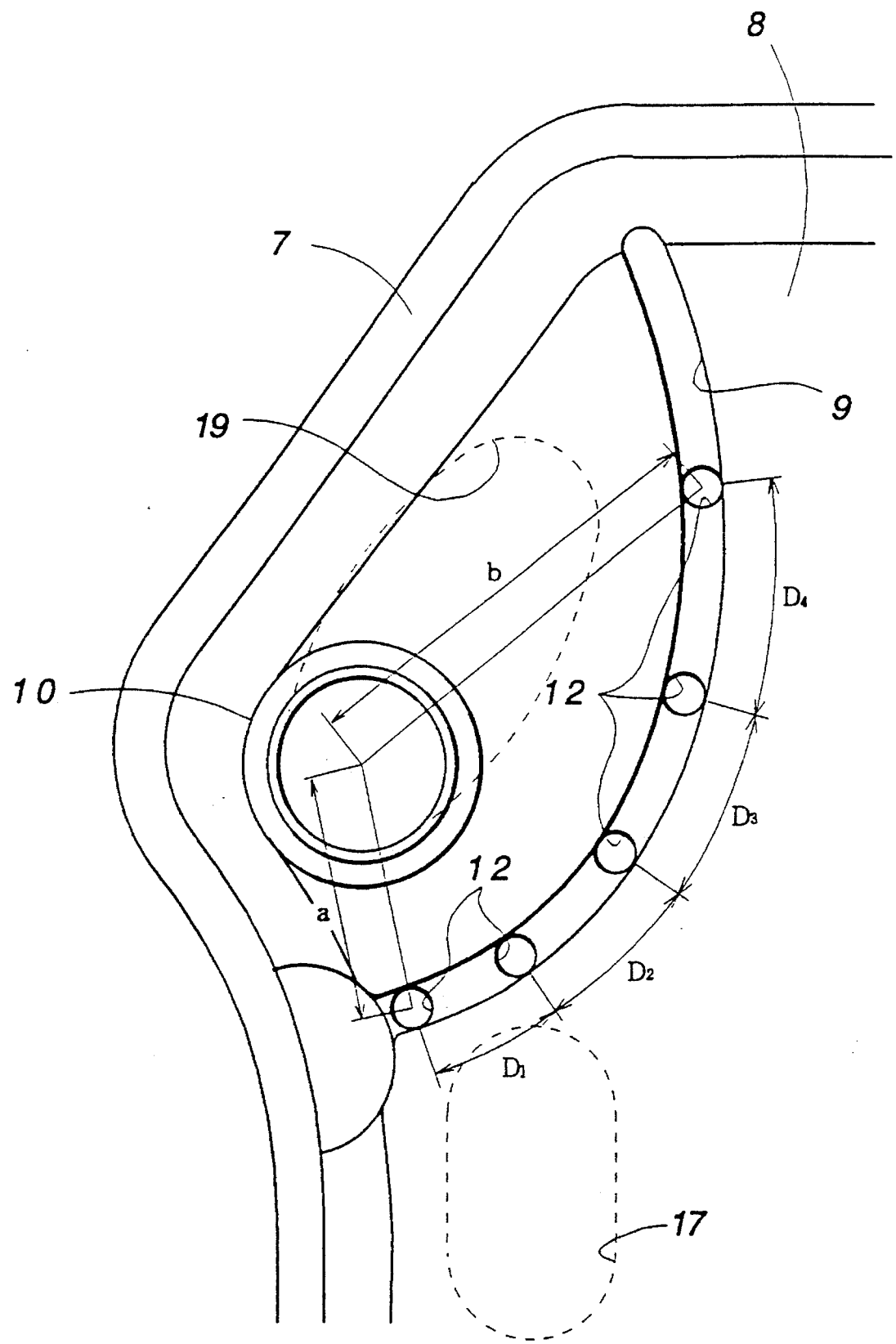
FIG. 4 is a top view of a part of the upper casing half of the first embodiment.

The upper casing half 1 is provided with an outlet 10 consisting of a tubular extension which integrally projects upward from the bottom plate 8 thereof. As best illustrated in FIG. 4, the inlet 10 partly overlaps with the communication passage 19 as seen in plan view. This outlet 10 is connected to an inlet end of an oil pump which is not shown in the drawings. The bottom plate 8 of the upper casing 1 is further provided with a plurality of beads 11 which project inward or downward. These beads 11 prevent the upper filter sheet 4 from clinging onto the surface of the bottom plate 8, and thereby obstructing the flows of the ATF in the upper chamber L and through the upper filter sheet 4, and guide the flow of the ATF, which has passed through the upper filter sheet 4, smoothly to the outlet 10.

Figure 3:
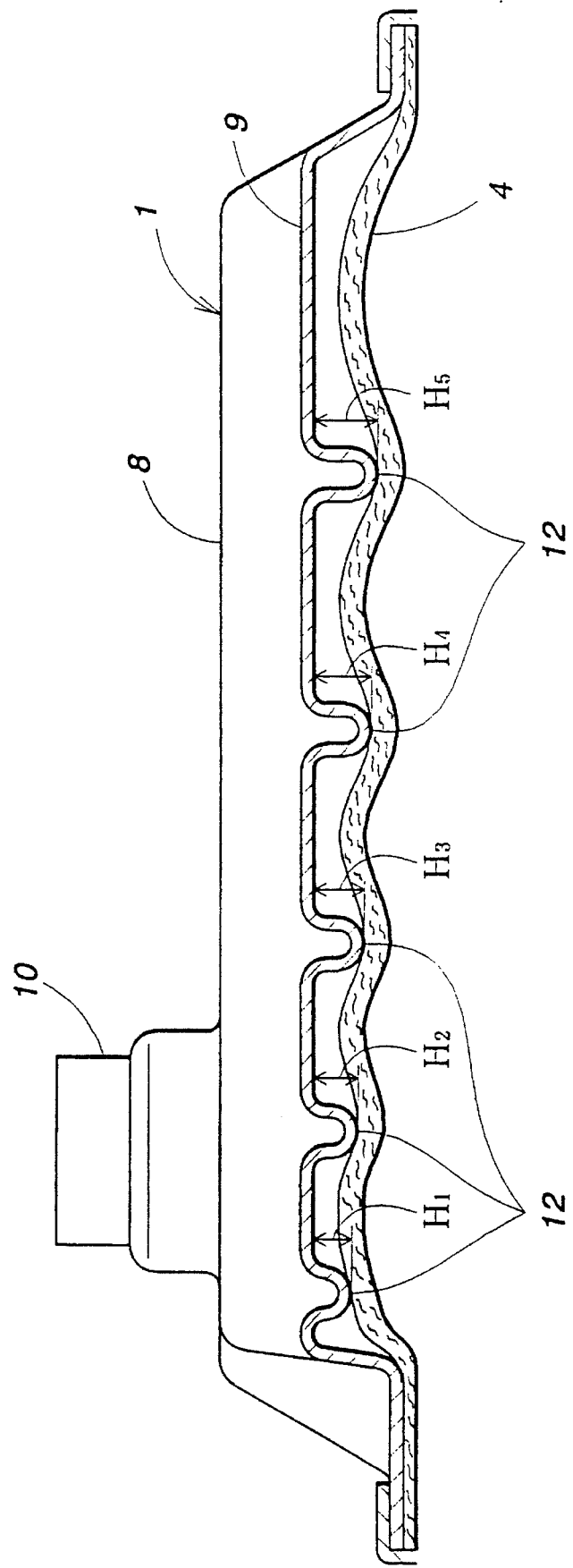
FIG. 3 is an enlarged sectional view taken along line III—III of FIG. 1.

The bottom plate 14 of the lower casing half 2 is provided with a tubular inlet 17 projecting into the casing, and the tubular inlet 17 is provided with an annular free end 18 which is adapted to be crimped over a peripheral edge of an inlet opening 5b of the lower filter sheet 5. Thus, the inlet 17 is communicated with the filter chamber F defined between the two filter sheets 4 and 5. As shown in FIG. 3, the inlet 17 is somewhat offset from the outlet 10 as seen in plan view.

As shown in FIGS. 3 and 4 in more detail, an arcuate ridge 9 projecting inward is formed in the part of the bottom plate 8 of the upper casing half 1 surrounding the outlet 10 and the communication passage 19 defined by the tubular member 6. This ridge 9 controls the balance between the two primary flows of the ATF between the inlet 17 and the outlet 10, one passing through the lower filter sheet 5 and the communication hole 19, and the other passing through the upper filter sheet 4 and directly headed for the outlet 10, by restricting the latter mentioned flow in the upper chamber U. The distance between the ridge 9 and the outlet 10 is gradually increased as the ridge 9 extends away from the inlet 17 (a<b in FIG. 4).

The ridge 9 is further provided with projections 12 as best illustrated in FIG. 3 so as to define a plurality of localized portions projecting from the ridge 9, and thereby serving as flow restricting means as described hereinafter. The heights of these projections 12 are progressively increased ($H_1<H_2<H_3<H_4<H_5$), and the distances ($D_1<D_2<D_3<D_4$) between the adjacent projections 12 are also increased as the ridge 9 extends away from the inlet 17.

In assembling this filter device, first of all, with the upper and lower filter sheets 4 and 5 placed one over the other, the tubular member 6 is fitted into the openings 4a and 5a of the filter sheets 4 and 5, and is crimped over the peripheral edges thereof. Then, the free end 18 of the tubular inlet 17 is crimped over the edge of the inlet opening 5b of the lower filter sheet 5. Finally, the upper and lower casing halves 1 and 2 are placed over the filter sheets 4 and 5, and the peripheral edge 13 of the lower casing half 2 is crimped over the peripheral edges of the filter sheets 4 and 5 and the upper casing half 1.

FIG. 1 shows the flow of the ATF inside the filter device with arrows. When the oil pump is activated, and a negative pressure is produced in the outlet 10 end of this filter device, the ATF is introduced into the filter device from the inlet 17, and then into the filter chamber F defined between the upper and lower filter sheets 4 and 5 via the inlet passage defined by the tubular extension of the lower casing half 2. As the ATF passes through the upper and lower filter sheets 4 and 5, any foreign matters that might be contained in the ATF are trapped in the filter chamber F.

The ATF which has passed through the lower filter sheet 5 flows toward the communication passage 19 along the beads 15 projecting from the bottom plate 14 of the lower casing half 2, and is expelled from the outlet 10 after passing through the communication passage 19. The ATF which has passed through the upper filter sheet 5 flows toward the outlet 10 along the beads 11, but this flow is somewhat restricted by the ridge 9 and the projections 12.

When the temperature of the ATF is low, and its viscosity is relatively high, when the filter sheets have clogged up to some extent due to excessive deposition of foreign matters, or when the flow rate of the ATF is relatively high due to a high rotational speed of the oil pump, the filter sheets 4 and 5 may be inflated due to the creation of a pressure difference across the filter sheets, and the upper filter sheet 4 may be pressed against the bottom plate 8 of the upper casing half 1. In such a case, the flow of the ATF through the upper filter sheet 4 would be substantially reduced, and a larger part of the ATF flow would be forced to take place through the lower filter sheet 5 with the result that the pressure difference across the filter sheets 4 and 5 would be increased further. However, according to the present embodiment, the upper chamber U is provided with the ridge 9 and the plurality of projections 12, and the flow through the upper filter sheet 4 is controlled. Also, the beads 11 prevent close contact between the upper filter sheet 4 and the bottom surface of the upper casing half 1, and this also contributes to the prevention of the blocking of the flow passing through the upper filter sheet 4 and the upper chamber U. As a result, the flow of the ATF can be continued to take place evenly through both the upper and lower filter sheets 4 and 5.

By appropriately adjusting the heights and widths of the ridge 9 and the projections 12, it is possible to achieve an optimum restriction of the flow through the upper filter sheet 4 so that creation of localized regions of high flow speed and stagnant regions can be avoided, and the efficiency of the filter element can be optimized at all times.

In the above described embodiments, the upper and lower casing halves 1 and 2 were made of stamp formed sheet metal, and increasing the height of the projections 12 may present a problem that the sheet metal may not be suitable for such a deep drawing work. Therefore, the sheet metal must be selected from those having a relatively high drawing capability. Normally, sheet metal such as steel plate capable of a high level of drawing tends to be expensive. However, according to the above described embodiment, the projections 12 are formed on the ridge 9 so that the effective height of the projections 12 may be increased without any substantial difficulty thanks to the provision of the ridge 9 even when the material may not be suitable for a high level of plastic drawing work.

Figure 5:
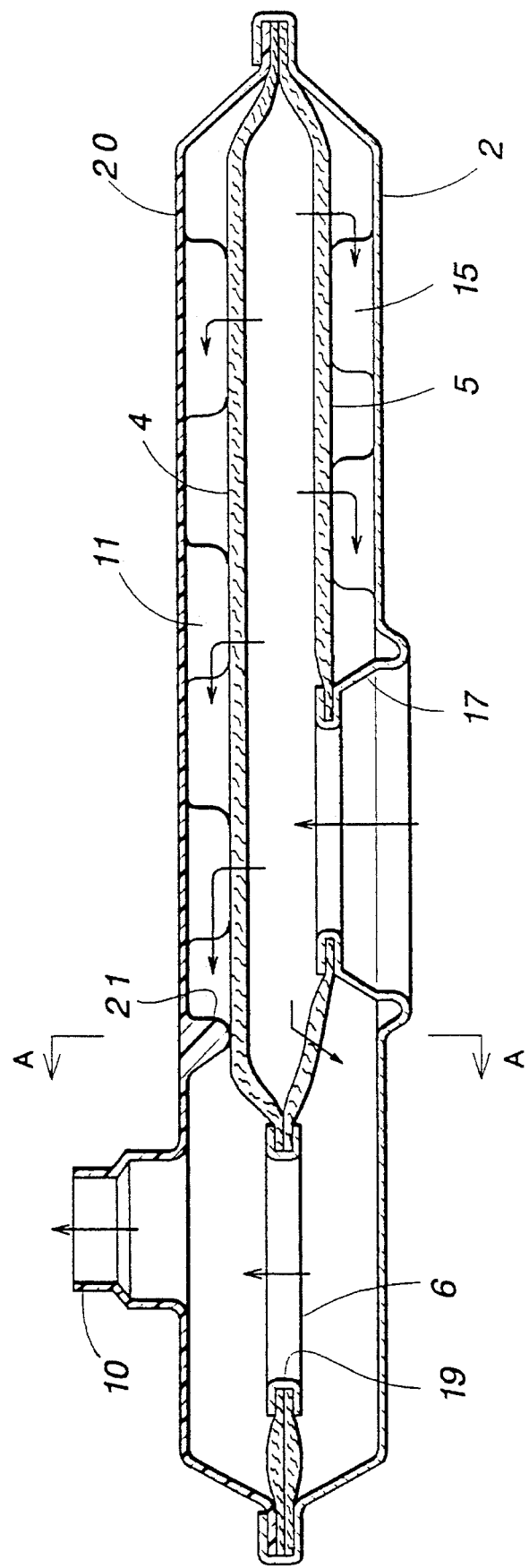
FIG. 5 is a view similar to FIG. 1 showing a second embodiment of the filter device according to the present invention.

FIGS. 5 and 6 show a second embodiment of the filter device according to the preset invention. In this embodiment, the upper casing half 20 is made of molded plastic or synthetic resin material, and a plurality of projections 21 serving as the flow restricting means are integrally molded with the upper casing half 20. No part corresponding to the ridge 9 of the previous embodiment is provided in the upper casing half 1. It is made possible because the plastic material can be molded with the projections 21 having desired heights without any difficulty as opposed to sheet metal which is required to have a certain drawing capability to allow relatively high projections to be formed. In this embodiment, the projections 21 are elongated in the direction of the flow of the ATF as shown in FIG. 6(B) to achieve a favorable flow guiding function.

Figure 7:
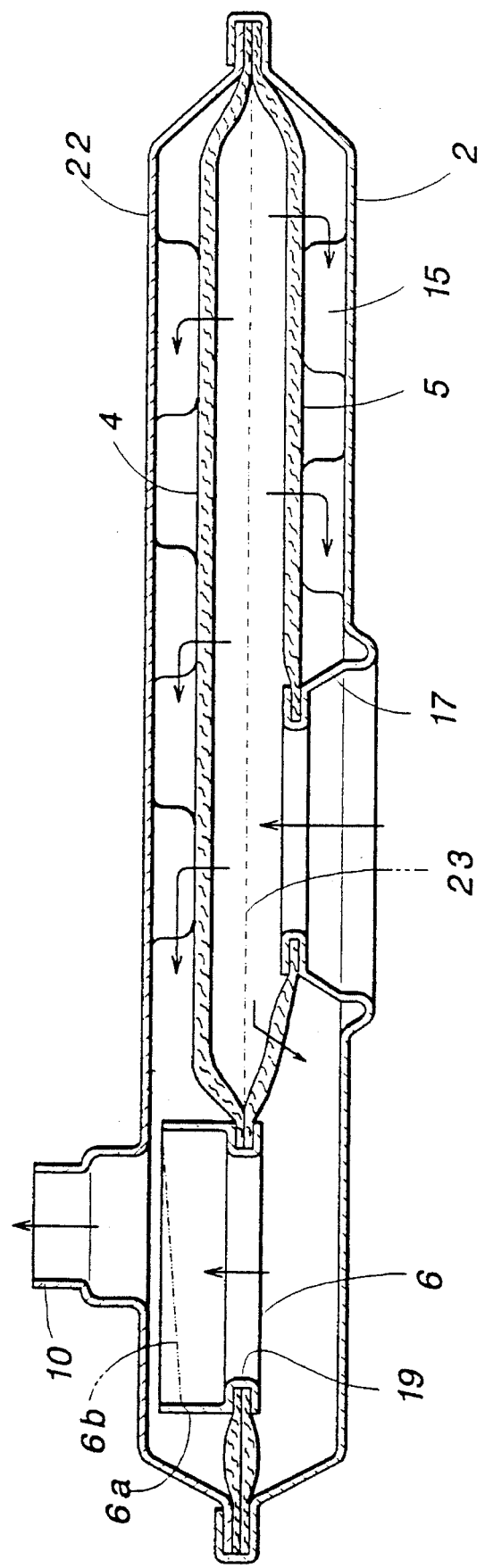
FIG. 7 is a view similar to FIG. 1 showing a third embodiment of the filter device according to the present invention.

In the previous embodiments, the flow restricting means were provided in the upper casing halves 1 and 20. In a third embodiment illustrated in FIGS. 7, the flow restricting means consists of a tubular extension 6a of the tubular member 6 which is crimped over the peripheral edges of the communication openings 4a and 5a of the filter sheets 4 and 5. In this case, the upper casing half 22 is not provided with any projections or a ridge which would serve as the flow restricting means. The tubular extension 6a may have a horizontal annular free end as illustrated in FIG. 7, but may also have an inclined (as indicated by the imaginary line 6b in FIG. 7) or rugged free end (as illustrated in FIG. 8) so that the tubular extension 6a may provide a optimally restricted passage for the flow of the ATF which has passed through the upper filter sheet 4 even when the tubular extension 6a is pushed against the bottom plate of the upper casing half 22.

In the above described embodiments, the depths of the upper and lower casing halves were more or less similar, but the depth of the lower casing half may be made substantially deeper than that of the upper casing half so that the narrower upper chamber for the flow of the ATF which has passed through the upper filter sheet may serve as the flow restricting means which controls the distribution of the flows passing through the upper and lower filter sheets 4 and 5.

As yet another alternative, it is also possible to provide a mesh or a perforated plate which may serve as the flow restricting means for controlling the flow of the ATF through the upper filter sheet 4. As even yet another alternative, it is also possible to use materials having different porosity or flow resistance for the upper and lower filter sheets for the same purpose.

Thus, according to the present invention, the efficiency of the filter element can be ensured at all times by using a highly simple and compact structure.

Although the present invention has been described in terms of preferred embodiments thereof, it is obvious to a person skilled in the art that various alterations and modifications are possible without departing from the scope of the present invention which is set forth in the appended claims.

What we claim is:

1. A filter device, comprising:
   a casing including a first casing half provided with an outlet, and a second casing half provided with an inlet;
   a filter element including a first filter sheet and a second filter sheet which are interposed in mutually overlaid condition between said first and second casing halves thereby defining a filter chamber between said filter sheets, a communication passage defined by joining peripheral edges of mutually juxtaposed communication openings of said filter sheets, and an inlet passage communicating said inlet with said filter chamber through an inlet opening provided in said second filter sheet opposing said second casing half;
   whereby first and second flow paths are defined between said inlet and said outlet, said first flow path passing through said first filter sheet, and second flow path passing through said second filter sheet and said communication passage;

flow restricting means being provided in said first flow path to optimally distribute flow rates between said first and second flow paths.

2. A filter device according to claim 1, wherein said flow restricting means comprise a plurality of projections arranged in said first casing half around said outlet.

3. A filter device according to claim 2, wherein said projections are formed on top of a ridge provided in said first casing half around said outlet.

4. A filter device according to claim 3, wherein said inlet and said outlet provided in said casing are mutually offset from each other, and a distance between said outlet and each of said projections is progressively increased as a distance between said inlet and the corresponding projection increases.

5. A filter device according to claim 3, wherein said inlet and said outlet provided in said casing are mutually offset from each other, and a height of each of said projections is progressively increased as a distance between said inlet and the corresponding projection increases.

6. A filter device according to claim 3, wherein said inlet and said outlet provided in said casing are mutually offset from each other, and a distance between adjacent ones of said projections is progressively increased as a distance between said inlet and the corresponding projections increases.

7. A filter device according to claim 3, wherein said first casing half is made of sheet metal, and said ridge and projections are formed by stamping.

8. A filter device according to claim 2, wherein said first casing half is made of plastic material, and said projections are integrally molded with said first casing half.

9. A filter device according to claim 8, wherein said projections are elongated in a radial directions with respect to said outlet.

10. A filter device according to claim 1, wherein said flow restricting means comprises a tubular extension of a tubular member crimped on peripheral edges of said communication openings of said filter sheets and defining said communication passage, said tubular extension being provided with a substantially annular free end which could abut a part of said first casing half surrounding said outlet.

11. A filter device according to claim 10, wherein said free end of said tubular extension is substantially parallel with a surface of said part surrounding said outlet.

12. A filter device according to claim 10, wherein said free end of said tubular extension is inclined with respect a surface of said part surrounding said outlet.

13. A filter device according to claim 10, wherein said free end of said tubular extension is provided with an irregular contour with respect a surface of said part surrounding said outlet.

14. A filter device according to claim 1, wherein an internal surface of at least one of said first and second casing halves are provided with beads for guiding flow of fluid in said filter device.

15. A filter device according to claim 10, wherein said communication passage is defined by a tubular member which are crimped upon said peripheral edges of said mutually juxtaposed communication openings of said first and second filter sheets.

16. A filter device according to claim 10, wherein said inlet passage is defined by an inwardly directed tubular extension of said second casing half having a free end which is crimped upon said inlet opening of said second filter sheet.

* * * * *